United States Patent
Sener et al.

(10) Patent No.: US 8,875,855 B2
(45) Date of Patent: Nov. 4, 2014

(54) WHEELED LUGGAGE CASE

(75) Inventors: James T. Sener, Glastonbury, CT (US); David L. Mathieu, Colchester, CT (US)

(73) Assignee: Travelpro International Inc., Boca Raton, FL (US)

( * ) Notice: Subject to any disclaimer, the term of this patent is extended or adjusted under 35 U.S.C. 154(b) by 99 days.

(21) Appl. No.: 13/546,386

(22) Filed: Jul. 11, 2012

(65) Prior Publication Data

US 2013/0220753 A1    Aug. 29, 2013

Related U.S. Application Data

(60) Provisional application No. 61/602,944, filed on Feb. 24, 2012.

(51) Int. Cl.
*A45C 5/14* (2006.01)
*B60B 33/02* (2006.01)

(52) U.S. Cl.
CPC ............. *A45C 5/14* (2013.01); *B60B 33/025* (2013.01)
USPC ........................ 190/18 A; 16/35 R

(58) Field of Classification Search
CPC ......... A45C 5/14; B60B 33/02; B60B 33/025
USPC ........................ 190/18 A; 16/35 R
See application file for complete search history.

(56) References Cited

U.S. PATENT DOCUMENTS

| | | | |
|---|---|---|---|
| 3,828,392 A | 8/1974 | Bolger | |
| 3,924,292 A | 12/1975 | Christensen | |
| 4,028,773 A * | 6/1977 | Morgan | 16/35 R |
| 4,054,965 A | 10/1977 | Vig et al. | |
| 4,336,629 A * | 6/1982 | Jarvis et al. | 16/35 R |
| 5,014,391 A | 5/1991 | Schulte | |
| 5,331,717 A | 7/1994 | Joslin et al. | |
| 5,517,718 A * | 5/1996 | Eichhorn | 16/35 R |
| 5,983,614 A | 11/1999 | Hancock et al. | |
| 6,134,748 A * | 10/2000 | Kuo | 16/35 R |
| 6,212,733 B1 * | 4/2001 | Yeh | 16/35 R |
| 6,725,501 B2 | 4/2004 | Harris et al. | |
| 7,017,228 B2 * | 3/2006 | Silverstein et al. | 16/35 R |
| 7,383,611 B2 | 6/2008 | Foster | |

(Continued)

FOREIGN PATENT DOCUMENTS

CA    2194596 A1    11/1997
GB    2 353 978 A    3/2001

(Continued)

OTHER PUBLICATIONS

International Search Report and Written Opinion, International Application No. PCT/US2013/027261, International Filing Date Feb. 22, 2013, Mailing Date: Apr. 26, 2013, 11 pages.

*Primary Examiner* — Sue A Weaver
(74) *Attorney, Agent, or Firm* — Reising Ethington P.C.

(57) ABSTRACT

This invention relates generally to wheeled luggage, and particularly to wheeled luggage with one or more controlled wheels for improved tracking and steering control of the luggage case when it is in motion. The invention provides a support structure for a luggage case comprising a plurality of spaced parallel wheels and at least one biasing element that is operable up to a certain torque to releasably restrain the angular movement at least one wheel to at least one angular position with respect to the base. Conveniently, the at least one angular position corresponds to a desired direction of travel.

17 Claims, 5 Drawing Sheets

(56) References Cited

U.S. PATENT DOCUMENTS

| | | |
|---|---|---|
| 7,896,143 B2 | 3/2011 | Lee |
| 2004/0163208 A1* | 8/2004 | Kuo .................................. 16/29 |
| 2005/0144755 A1* | 7/2005 | Miyoshi ........................ 16/35 R |
| 2008/0209673 A1 | 9/2008 | Cooper et al. |

FOREIGN PATENT DOCUMENTS

| | | |
|---|---|---|
| GB | 2 354 436 A | 3/2001 |
| GB | 2 363 324 A | 12/2001 |
| JP | 4863531 B1 * | 1/2012 |
| WO | WO 98/42523 A1 | 10/1998 |

* cited by examiner

WHEELED LUGGAGE CASE

CROSS-REFERENCE TO RELATED APPLICATION

This present application claims priority from U.S. Provisional Application No. 61/602,944, filed on Feb. 24, 2012, the contents of which are incorporated herein by reference.

FIELD OF THE INVENTION

This invention relates generally to wheeled luggage, and particularly to wheeled luggage with one or more controlled wheels for improved tracking and steering control of the luggage case when it is in motion.

BACKGROUND

In order to address the difficulties carrying luggage, wheeled luggage has been developed. Wheeled luggage refers to the various suitcases and baggage that employ wheeling devices, and allow users to roll their luggage instead of carry it. The wheeled luggage typically deploys a handle to aid in the transport and typically the luggage has a plurality of wheels integrated into the design. The wheels are permanent features of the luggage and often support the weight of the luggage and rotate so as to allow the luggage to be rolled in any desired direction. While wheeled luggage generally alleviates the strain caused by carrying the luggage, the luggage can sometimes be difficult to control and steer, particularly in crowded or constrained areas.

The majority of such luggage cases, intended for the transport of goods or personal items, are typically provided with four wheels, each freely rotatable through 360 degrees. It is advantageous for a luggage case to move in any direction unimpeded or with minimal force required to rotate or displace the luggage. This allows the user to make small adjustments to the location or orientation of the luggage case, especially when moving from a stationary position or moving at low speeds over short distances.

In practice, this frequently leads to steering difficulties, either during required straight line movement, or when negotiating a corner or bend. Also, when users move at higher speeds, they frequently encounter trouble turning or navigating the luggage case due to the case drifting on uneven or sloped surfaces. In addition, users have to exert energy to maintain control or steer the luggage case, especially when movement is at higher speeds and the desired path is generally in a straight line.

SUMMARY OF THE INVENTION

Accordingly a first aspect of the present invention provides a support structure for a luggage case comprising a plurality of spaced wheels supported on the base and rotatable with respect to the base about a pivot axes, and biasing element that is operable to releasably restrain the angular movement at least one wheel to at least one angular position with respect to the base.

Conveniently, the at least one angular position corresponds to a desired direction of travel. In other angular positions the wheels and biasing element may be operable to permit free rotation unless and until re-registration of the biasing element occurs. Additionally or alternatively the biasing element may be operable to bias the at least one wheel into a desired angular position when displaced therefrom.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In describing the components of the luggage and alternative versions, or embodiments, of some of these components, the same reference number may be used for elements that are the same as, or similar to, elements described in other versions or embodiments.

Figure 1:
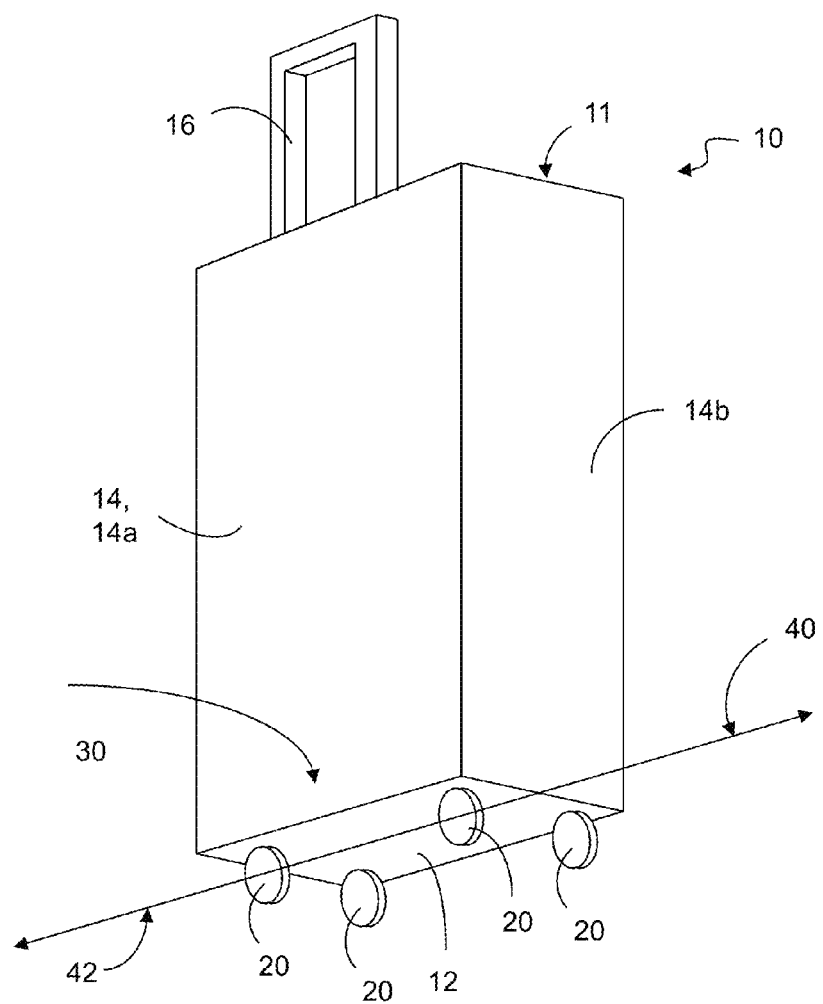
FIG. 1 is a perspective view of a wheeled luggage case showing a side and base, the base supporting a plurality of wheels.

Referring now to FIG. 1, a wheeled luggage case according to the present invention is illustrated generally at 10. The luggage case 10 comprises a luggage body 11, which in turn comprises a base 12, and may include one or more sides 14. In some embodiments, the luggage case may include five sides 14a-e (e.g., top, left, right, front and back sides). Other embodiments of the luggage case 10 may include more or less than five sides. The base 12 and the sides 14 of the luggage case 10 may define a main packing compartment. Each side 14 may have a generally rectangular shape to form a generally parallelepiped luggage case 10. In some embodiments, the sides 14 may have other shapes to define a luggage case 10 with a desired shape other than generally parallelepiped. In some embodiments, the luggage case 10 may further include a handle 16 connected to one or more of the sides 14 for moving, lifting, controlling or steering the luggage case 10. The handle 16 may be retractable into the body of the luggage case 10 and may extend substantially co-planar with one of the sides 14. Other embodiments of the handle 16 may be integral to a side 14, or be made of flexible material and connected to a side 14. The following description will be described with respect to a handle 16 mounted substantially co-planar to a side 14 that intersects the base 12, but it should be understood as applicable for other embodiments of the handle 16, and those skilled in the art will recognize that handles may be rearranged, replaced, or eliminated altogether without necessarily departing from the spirit and scope of the present invention.

The luggage case 10 further comprises a plurality of spaced wheels 20 supported on the base 12. Each wheel 20 is rotatable about a pivot axis substantially perpendicular to the base 12, and each such axis is substantially parallel to the axes of the other wheels 20. Each pairing of two of the plurality of wheels 20 defines a longitudinal axis 30. Referring to FIG. 1, a longitudinal axis 30 is shown running through two of the wheels, in this example, parallel to the intersection of the side 14a and the base 12. The longitudinal axis 30 further defines a first direction of travel 40 and a second direction of travel 42. All directional references (e.g., upper, lower, upward, downward, left, right, leftward, rightward, top, bottom, above, below, vertical, horizontal, clockwise, and counterclockwise), and references to the first direction of travel 40 and second direction of travel 42 are only used for identification purposes to aid the reader's understanding of the embodiments of the present invention, and do not create limitations, particularly as to the position, orientation, or use of the invention unless explicitly set forth in the claims. It will be appreciated that in particular the selection of the first direction 40 and second direction 42, or any of a plurality of desired directions, may be selected without necessarily departing from the spirit and scope of the present invention.

Figure 2:
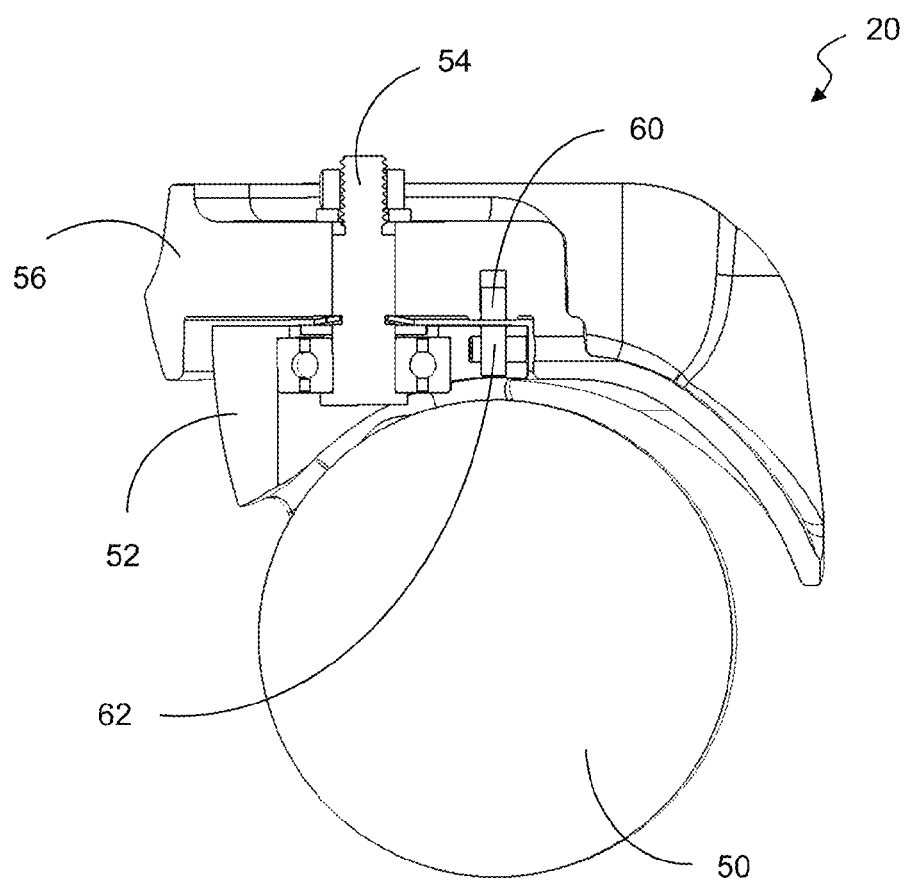
FIG. 2 is cross-section view of one embodiment of a controlled wheel.

FIG. 2 illustrates one embodiment of a wheel 20 in accordance with this present invention. For the purposes of this description, the structure of one embodiment of a wheel 20 may be divided into four main components or assemblies, the rolling body 50, the fork 52, the stem 54, and the mount 56. It will be appreciated that in this exemplary embodiment, the stem 54 contains the pivot axis around which the rolling body 50 and the fork 52 rotate with respect to the mount 56. It is preferable that the mount 56 is supported on the base 12 of the luggage case 10 and rotatably fixed therewith. It will be appreciated that alternate structures may be employed to support the wheel 20 on the base 12. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, both in regards to the wheels 20 and other components of this description.

FIG. 2 further illustrates a wheel biasing element that operates to releasably restrain the angular relationship of the components of the wheel 20. The biasing element is comprised of a first member 60 and second member 62, the second member 62 being rotatable with respect to the first member 60. Further, the first member 60 is rotatably fixed with respect to the mount 56 and thereby the base 12, and the second member is rotatably fixed with respect to the fork 52 and the rolling body 50.

In this exemplary embodiment, the first member 60 and second member 62 are comprised of first and second magnet elements. It is particularly advantageous to use magnetic elements to restrain rotation because there are no contact faces and no parts subject to wear. The first member 60 and second member 62 may be located in co-axial spaced apart relationship so as to provide mutually facing surfaces.

It will be appreciated by one skilled in the art that other means of encouraging and maintaining a desired registration may optionally be used without derogating from the spirit and scope of the invention. For example, other embodiments of the first member 60 and second member 62 may comprise one or more spring plungers or balls cooperating with spaced and aligned notches. In another embodiment, a central rod can run up and down the stem 54 or lie outside the stem 54 to create a similar registration effect.

In this exemplary embodiment, the magnetic elements may further comprise at least one permanent magnet. More particularly the magnetic elements are provided so each component of at least one pair of magnetically co-operable components is associated with each of the first member 60 and second member 62, which are spaced to provide a small air gap between the magnetically co-operable components creating a magnetic flux that provides the releasably restraining effect when the magnetically co-operable components are axially aligned, thereby establishing a bias towards a desired angular relationship between the first member 60 and second member 62.

In another embodiment, the first member 60 and/or second member 62 may optionally comprise more than one discrete element that encourages registration of the first member 60 and second member 62 in more than one angular position relative to each other. Additionally or alternatively the biasing element may be operable to bias the at least one wheel into a desired angular position when displaced therefrom.

In this exemplary embodiment, when the first member 60 and second member 62 are aligned opposite one another, the magnetic flux releasably restrains rotation of the rolling body 50 and the fork 52 with respect to the mount 56, which in turn communicates with the base 12 of the luggage case 10. This structure thereby creates a first state A under which the rolling body 50 is freely rotatable with respect to the base 12, and a second state B whereby the rolling body 50 is releasably restrained to one or more desired angular positions. For the purpose of this description, a wheel 20 cooperating with a biasing element to create a first state A and a second state B will be considered a controlled wheel 21.

It is preferable that the torque that must be applied to release the engagement of the biasing element may be selected to reflect the characteristics of the luggage case 10, such as its size and capacity, and the conditions under which it is expected to operate. It will be appreciated that each of the optional means for encouraging registration of the first member 60 and second member 62 are capable of being designed or adjustable to exhibit one or more torque thresholds separating a first state A under which the rolling body 50 is freely rotatable with respect to the base 12, and a second state B whereby the rolling body 50 is restrained.

For example, when magnetic elements are employed the torque required to exceed the magnetic flux is a factor of the surface area and strength of the magnet(s), and the air gap. When a ball and notch combination is employed, the torque required may be a function of several structural characteristics such as the notch and ball size, or a spring constant.

Further, when the first member 60 and/or second member 62 comprise more than one registration element, the designed or adjustable thresholds required may be the same for each such registration element, or different for each desired relative angular position.

Figure 3:
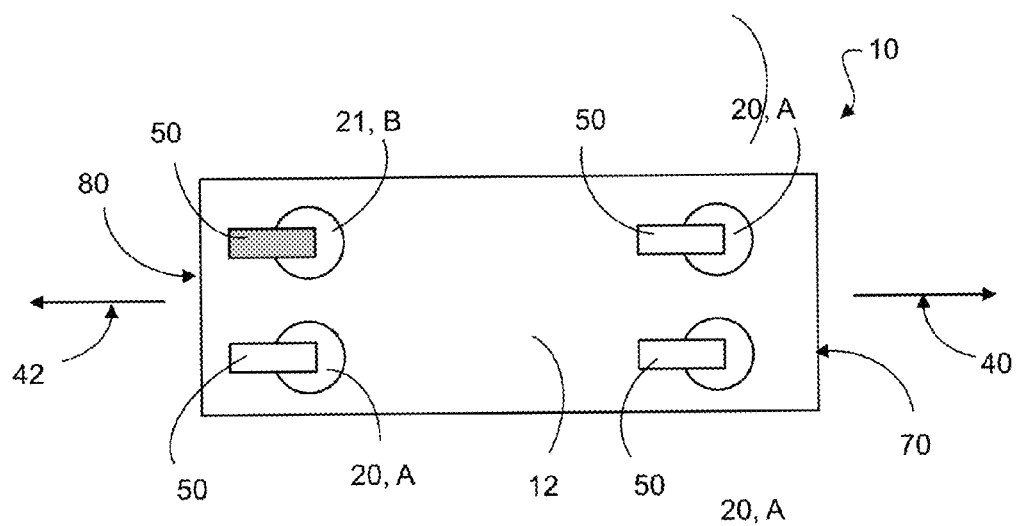
FIG. 3 is a schematic plan view of the wheeled luggage of FIG. 1 showing one controlled wheel trailing in a first direction of travel.

FIG. 3 illustrates a schematic plan view of one embodiment of the present invention where the luggage case 10 is supported by a plurality of rolling bodies 50. While this embodiment depicts four rolling bodies 50, it will be understood by one skilled in the art that that the number and arrangement of the rolling elements may be altered without necessarily departing from the spirit and scope of the present invention. In this particular depiction, the luggage case 10 is further connected with three wheels 20 and one controlled wheel 21. For the purposes of illustrating the operation of the present invention, the luggage case 10 is shown with a first direction of travel 40, and a leading portion 70 and a trailing portion 80 of the base 12.

In FIG. 3, the three wheels 20 are not connected to a biasing element, and are therefore in a perpetual first state A. The controlled wheel 21 is operable in both the first state A and the second state B, depending on how the user applies force to the luggage case 10 to effect movement. In this case, the controlled wheel 21 is shown to enter the second state B when the user urges the luggage case in the first direction 40.

It is particularly advantageous if the controlled wheel 21 is positioned proximate the trailing portion 80 of the luggage case 10 when operating in the releasably restrained second state B. This enhances the steering control of the luggage case, causing it to steer in a manner similar to a typical automobile with steering proximate the leading portion 70 and at least one restrained wheel proximate the trailing portion 80. This, however, is not essential and does not create a limitation on the present invention.

In operation, if the luggage case 10 of FIG. 3 was to be urged in any direction substantially different from the first direction of travel 40, such as the second direction of travel 42, the controlled wheel 21 would release and enter the first state A.

In another embodiment of the present invention, more than one controlled wheel 21 may be combined with more than one wheel 20. For example, two controlled wheels 21 may be positioned proximate the trailing portion 80 for an increase in the effect cause by the releasable retention of the controlled wheels 21.

Figure 4A:
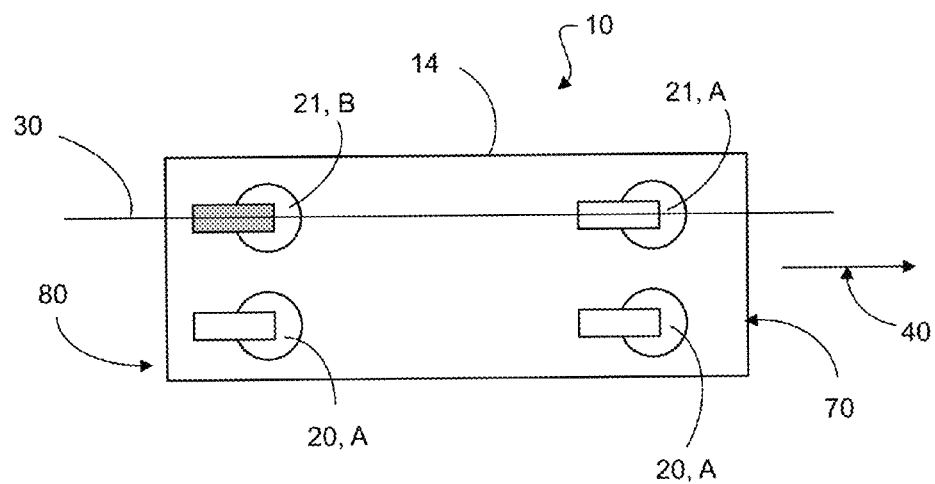
FIG. 4a is a schematic plan view of the wheeled luggage of FIG. 1 showing two controlled wheels on a longitudinal axis moving in a first direction of travel.
Figure 4B:
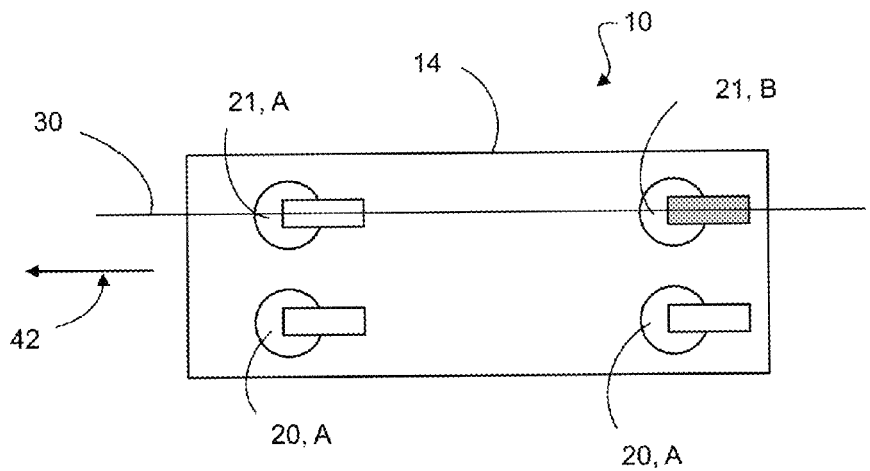
FIG. 4b is a schematic plan view of the wheeled luggage of FIG. 1 showing two controlled wheels on a longitudinal axis moving in a second direction of travel.

FIGS. 4a and 4b illustrate a further embodiment wherein at least two controlled wheels 21 are positioned on the longitudinal axis 30. Further, the biasing element of each pair of controlled wheels 21 on a longitudinal axis 30 are adapted to operate in opposite directions; one operating to cause its associated controlled wheel 21 to be in the second state B when the luggage case 10 is urged in the first direction 40, and one operating to cause its associated controlled wheel 21 to be in the first state A when moving in this same direction.

In this specific exemplary embodiment, the controlled wheels 21 are adapted so that the controlled wheel proximate the trailing portion 80 is in the second state B during motion and the controlled wheel proximate the leading portion 70 is in the first state A, but these may be reversed without departing from the spirit and scope of the present invention.

In FIG. 4a it can be seen that the controlled wheel 21 proximate the trailing portion 80 is in the second state B when the luggage case is urged in the first direction 40. In FIG. 4b it can be seen that the same controlled wheel 21 is in the first state A when the luggage case is urged in the second direction 42. This leads to one particularly advantageous aspect of the present invention where the luggage case 10 can be designed to releasably retain one or more controlled wheels 21 in one or more desired directions of travel 40, 42 such that the controlled wheel 21 in the first state A is always proximate the leading edge 70 in any of those designed directions thereby improving the control and the ease of steering the luggage case 10 as described in relation to FIG. 3.

Figure 5A:
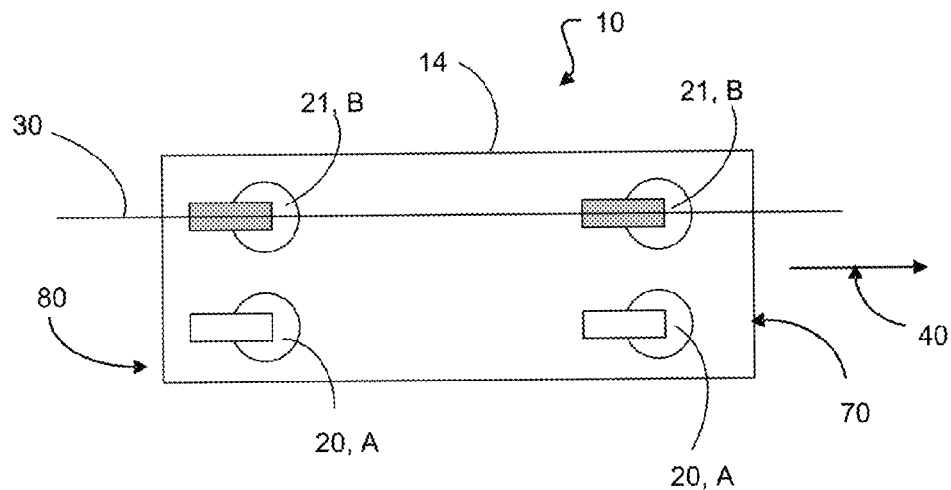
FIG. 5a is a schematic plan view of the wheeled luggage of FIG. 1 showing another embodiment of two controlled wheels on a longitudinal axis moving in a first direction of travel.
Figure 5B:
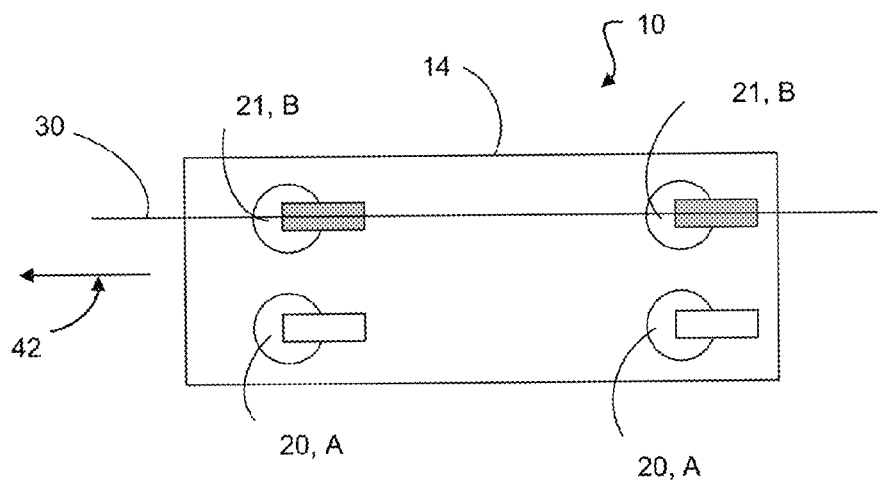
FIG. 5b is a schematic plan view of the wheeled luggage of FIG. 1 showing the other embodiment of two controlled wheels on a longitudinal axis moving in a second direction of travel.

FIGS. 5a and 5b illustrate a further embodiment in which the first member 60 and/or second member 62 of two or more controlled wheels 21 comprise more than one discrete element that encourages registration of the first member 60 and second member 62 in more than one angular position relative to each other. Like reference numerals denote like elements. This structure thereby creates a first state A under which the rolling body 50 is freely rotatable with respect to the base 12, and a second state B whereby the rolling body 50 is releasably restrained to one or more desired angular positions.

In a further aspect of this invention, the controlled wheels 21 may be positioned to minimize the moment created between the handle 16 and the controlled wheels operating in the second state B. A moment is generally defined as a measure of the torque produced by a force which causes an object to rotate about an axis, which is equal to the force multiplied by the perpendicular distance of the axis from the line of action of the force. In this regard, the axis may be considered to be the pivot axis of the controlled wheel 21 that may be in the second state B from time to time and the perpendicular distance is that distance measured to where a user transfers a directing force to the luggage case 10.

In practice, the handles 16 of luggage cases 10 are often designed to retract in to the case for easy storage and rapid deployment, thereby increasing the ease of use for the user. These handles 16 are often mounted in such a manner as to be substantially flush with one of the sides 14. This serves to maximize the available cargo carrying capacity of the luggage case 10. Accordingly, in one embodiment the controlled wheels 21 may be positioned so the longitudinal axis 30 is proximate the side 14 to which the handle 16 is connected. It will be appreciated by those skilled in the art that other arrangements and orientations may be adopted that are also within the scope of this invention.

It will be understood that the specification is illustrative of the present invention and that other embodiments within the spirit and scope of the invention will suggest themselves to those skilled in the art. All references cited herein are incorporated by reference. While the foregoing provides certain non-limiting example embodiments, it should be understood that combinations, subsets, and variations of the foregoing are contemplated. The monopoly sought is defined by the claims.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A piece of wheeled luggage comprising:
   a luggage body having a base and a plurality of sides together defining a packing compartment, the base intersecting at least one of the sides;
   a plurality of spaced and parallel wheels supported on the base, the wheels each having a mount connected to the base and a rolling body, the rolling body being rotatable about a pivot axis substantially perpendicular to the base;
   a biasing element comprising a first member and a second member, the second member being rotatable with respect to the first member, the biasing element being operable to releasably restrain movement of the second member in at least one angular position with respect to the first member, the second member being releasable with respect to the first member in response to a torque applied about the pivot axis;

wherein the first member is rotatably fixed with respect to the base and the second member is rotatably fixed with respect to at least one rolling body, thereby defining a first controlled wheel.

2. The wheeled luggage of claim 1, further comprising a longitudinal axis extending through two of the wheels, the longitudinal axis being substantially parallel to the intersection of the base and the side and defining a first direction of travel and a second direction of travel, wherein the first controlled wheel is releasably restrained in at least one of the first direction of travel and second direction of travel.

3. The wheeled luggage of claim 2, further comprising a biasing element connected to a wheel other than the first controlled wheel, defining a second controlled wheel.

4. The wheeled luggage of claim 3, wherein the first controlled wheel and the second controlled wheel are spaced on the longitudinal axis.

5. The wheeled luggage of claim 4, further comprising a handle, the handle being connected to the luggage body, wherein the handle, the first controlled wheel and the second controlled wheel are substantially co-planar.

6. The wheeled luggage of claim 4, wherein the first controlled wheel is releasably restrained in the first direction of travel and the second controlled wheel is releasably restrained in the second direction of travel.

7. The wheeled luggage of claim 1, wherein the first member comprises a first magnet and the second member comprises a second magnet and wherein the first magnet and the second magnet are disposed to have confronting faces that are spaced apart to define a gap.

8. The wheeled luggage of claim 1, wherein the biasing element is operable to releasably restrain movement of the second member in a plurality of angular positions with respect to the first member.

9. A piece of wheeled luggage comprising:
a luggage body having a base and a plurality of sides together defining a packing compartment, the base intersecting at least one of the sides, a plurality of wheels mounted to the base, at least one of the wheels being rotatable about a pivot axis, the luggage body further having a wheel biasing element comprising a first member and a second member, the second member being rotatable with respect to the first member, the wheel biasing element being operable to releasably restrain movement of the second member about the pivot axis in at least one angular position with respect to the first member, the second member being released with respect to the first member in response to a torque applied about the pivot axis.

10. The wheeled luggage of claim 9 further comprising at least one rolling body connected to the luggage body, wherein the first member is rotatably fixed with respect to the luggage body and the second member is rotatably fixed with respect to the least one rolling body, thereby defining a first controlled wheel.

11. The wheeled luggage of claim 10, further comprising a longitudinal axis, the longitudinal axis defining a first direction of travel, wherein the first controlled wheel is releasably restrained in at least the first direction of travel.

12. The wheeled luggage of claim 11, further comprising a second wheel biasing element connected to the luggage body, and wherein the longitudinal axis defines a second direction of travel opposite the first direction of travel, wherein the first controlled wheel is also releasably restrained in the second direction of travel.

13. The wheeled luggage of claim 10, further comprising a second controlled wheel, wherein the first controlled wheel and the second controlled wheel are spaced on a longitudinal axis defining a first direction of travel and a second direction of travel.

14. The wheeled luggage of claim 13, further comprising a handle, the handle being connected to the luggage body, wherein the handle, the first controlled wheel and the second controlled wheel are substantially co-planar.

15. The wheeled luggage of claim 13, wherein the first controlled wheel is releasably restrained in the first direction of travel and the second controlled wheel is releasably restrained in the second direction of travel.

16. The wheeled luggage of claim 9, wherein the first member comprises a first magnet and the second member comprises a second magnet and wherein the first magnet and the second magnet are disposed to have confronting faces that are spaced apart to define a gap.

17. The wheeled luggage of claim 9, wherein the wheel biasing element is operable to releasably restrain movement of the second member in a plurality of angular positions with respect to the first member.

\* \* \* \* \*